(12) United States Patent
Guo et al.

(10) Patent No.: US 8,273,452 B2
(45) Date of Patent: Sep. 25, 2012

(54) POLYMERIC FILMS

(75) Inventors: Hailan Guo, Warrington, PA (US); Jiun-Chen Wu, Princeton Junction, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 728 days.

(21) Appl. No.: 12/215,516

(22) Filed: Jun. 27, 2008

(65) Prior Publication Data

US 2009/0017287 A1    Jan. 15, 2009

Related U.S. Application Data

(60) Provisional application No. 60/959,253, filed on Jul. 12, 2007, provisional application No. 61/009,169, filed on Dec. 26, 2007.

(51) Int. Cl.
  *B32B 5/16* (2006.01)
  *B32B 27/40* (2006.01)
  *C08L 33/06* (2006.01)

(52) U.S. Cl. ............. 428/327; 428/424.4; 428/501; 428/524; 525/228

(58) Field of Classification Search ............. 428/424.4, 428/501, 524, 327; 525/228
See application file for complete search history.

(56) References Cited

U.S. PATENT DOCUMENTS

| | | | | |
|---|---|---|---|---|
| 3,812,205 A | * | 5/1974 | Dunkelberger | 525/261 |
| 4,107,235 A | * | 8/1978 | DeWitt, III | 525/212 |
| 4,141,935 A | * | 2/1979 | Dunkelberger | 428/220 |
| 4,452,941 A | | 6/1984 | Kishida et al. | |
| 4,814,373 A | * | 3/1989 | Frankel et al. | 524/460 |
| 6,838,507 B2 | | 1/2005 | Chou et al. | |
| 7,691,942 B2 | | 4/2010 | Bardman et al. | |
| 2001/0009929 A1 | * | 7/2001 | Blankenship et al. | 521/64 |
| 2007/0043162 A1 | * | 2/2007 | Bardman et al. | 524/502 |

FOREIGN PATENT DOCUMENTS

| | | |
|---|---|---|
| EP | 0390144 A | 3/1990 |
| GB | 1450175 A | 9/1976 |
| JP | 11077939 A | 3/1999 |

* cited by examiner

*Primary Examiner* — Thao T. Tran
(74) *Attorney, Agent, or Firm* — Stephen T. Falk

(57) ABSTRACT

A melt processed film comprising a polymer having several acrylic components.

10 Claims, No Drawings

POLYMERIC FILMS

This is a non-provisional application of prior U.S. Provisional Application Ser. No. 60/959,253 filed on Jul. 12, 2007 and U.S. Provisional Application Ser. No. 61/009,169 filed on Dec. 26, 2007.

This invention is a melt processed acrylic film with good weather resistance, transparency, flexibility, mechanical strength and toughness.

There are a variety of PVC and polyethylene films that are used commercially for outdoor applications, for example, to cover greenhouses and windows. These films are melt processed (e.g., blown or cast) from resin, and as such are economical to make. However, while such films are commonly used for such applications, they tend to degrade over time, losing strength and ultimately failing. Thus, they have to be replaced fairly often.

Acrylic polymers are known to be more weather resistant than PVC or polyethylene, and as a result, acrylic polymers have been used as capstock on exterior vinyl siding, window profile, and the like. However, those acrylic films are supported by substrates (e.g., siding) on which they overlay. If unsupported by such a substrate, prior acrylic films suffer from poor tear strength and lower flexibility than PVC and polyethylene films, which is undesirable. Acrylic films in the art include those in U.S. Pat. Nos. 4,141,935, 3,562,235, 3,843,753 and 3,812,205. However such films are typically containing high levels of crosslinking agent, and heavily cross-linked polymers usually creating considerable gel content (% insoluble polymer), and small swell ratio under the test method described below. Acrylic films made from resins containing high % insoluble polymers and small swell ratio tend to have poor tear strength, so if such films are used alone without laminated onto a supporting substrate, they cannot withstand the stresses of outdoor applications as well as PVC or polyethylene films. Among the stresses are wind stresses and shrinkage and expansion forces.

JP1999077939A discloses a greenhouse film made with a thermoplastic polyurethane coated on each side with a waterborn coating composition containing an acrylic (co)polymer made with methylmethylacrylate.

This invention is a melt processed film, comprising two polymer components wherein the first component comprises a $C_1$-$C_6$ alkyl acrylate (co)polymer with a Tg between 60 and 120° C., and the second component comprises a C1 to C12 (alkyl)acrylate (co)polymer with a Tg less than 10° C., wherein the gram weight ratio of the two components is less than 0.85, wherein the swell ratio of the film is at least 15, and wherein one of the polymer components is polymerized in the presence of the other.

In another aspect of this invention the film further comprises a third component comprising a $C_1$-$C_{12}$ alkylacrylate (co)polymer with a Tg of between 60 and 120° C., and wherein gram weight ratio of the combined weight of the first and third components to the weight of the second component is less than 0.85, and wherein two of the components are polymerized in the presence of one of the components.

Alternatively, the third component can comprise a first through a fourth stage polymer composite wherein the first elastomeric, relatively soft first-stage polymer is polymerized from an aqueous emulsified monomer system containing from about 75-99.8 weight percent of at least one $C_1$ to $C_8$ alkyl acrylate and about 0.1-5 weight percent of at least one crosslinking polyethylenically unsaturated monomer, the balance to total 100 weight percent of first-stage monomer system comprising one or more copolymerizable monoethylenically unsaturated monomers, and the monomer system being chosen so that the maximum glass transition temperature is not over −20° C.;

the second-stage polymer is polymerized, in the presence of the resultant aqueous system from the first-stage polymerization, from an aqueous emulsified monomer system containing about 10-90 weight percent of at least one $C_1$ to $C_8$ alkyl acrylate, and 9-89.9 weight percent of at least one $C_1$ to $C_4$ alkyl methacrylate;

wherein the third-stage polymer is polymerized, in the presence of the resultant aqueous system from the second-stage polymerization from an aqueous emulsified monomer system containing about 5-40 weight percent of at least one $C_1$ to $C_8$ alkyl acrylate and about 95-60 weight percent of at least one $C_1$ to $C_4$ alkyl methacrylate; and the fourth-stage polymer is polymerized, in the presence of the resultant aqueous system from the third-stage polymerization, from an aqueous emulsified monomer system containing about 80-100% weight percent of at least one $C_1$ to $C_4$ alkyl methacrylate and the balance, to total 100 weight percent of the fourth-stage monomer system, of at least one $C_1$ to $C_8$ alkyl acrylate; the weight of the first-stage monomer system being about 10-75% of the total weight of the polymer composition and the weight of the subsequent stages being about 90-25% of the total weight of the polymeric composition, wherein into each of the first- and second-stage monomer systems from about 0.1 to 1 weight percent of at least one graftlinking monomer is incorporated wherein the graftlinking monomer is a copolymerizable monomer containing at least two addition polymerizable unsaturated functional groups, each of which polymerize at substantially different rates with respect to each other. This four stage polymer composite is disclosed in U.S. Pat. No. 4,141,935 that we incorporate by reference herein.

In this invention the first component preferably has weight average molecular weight less than 1 million the second component has weight average molecular weight greater than 3 million. and the third component has a weight average molecular weight less than 1 million. Preferably, the third component has a weight average molecular weight less than 300,000.

Preferably films of this invention are made from the aforesaid the polymer components where those components are formed using emulsion polymerization to create latex particles size less than 500 nanometers prior to melt processing. These components form particles where particles individually contain more than one component.

This invention also is a multilayer film with outer layers made from the two-component acrylic composition above (optionally made from the three-component acrylic composition described above), and a core layer between the outer layers comprising a polymeric composition selected from a thermoplastic polyurethane and a polyvinylbutryal or a combination of the two.

This invention also is a greenhouse or agricultural tunnel covered with a film of this invention.

By "film" we mean a polymeric sheet that is less than about 0.50 mm. If the film is a multilayer film as described above, we prefer that each of the outer layers be from about 20 to about 100 micrometer thick, and the core layer be from about 20 to about 200 micrometer thick.

By "(co)polymer" we refer to either or both of a homopolymer or co-polymer.

"Glass transition temperature" or "$T_g$" is the glass transition temperature, of a copolymer calculated with the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, based on weight of monomers charged to the reaction vessel, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The glass transition temperatures of homopolymers for the purposes of this invention are those reported in "Polymer Handbook", edited by J. Brandrup and E. H. Immergut, Interscience Publishers, 1966, unless that publication does not report the Tg of a particular homopolymer, in which case the Tg of the homopolymer is measured by differential scanning colorimetry (DSC). To measure the glass transition temperature of a homopolymer by DSC, the homopolymer sample is prepared and maintained in the absence of ammonia or primary amine. The homopolymer sample is dried, preheated to 120° C., rapidly cooled to −100° C., and then heated to 150° C., at a rate of 20° C./minute while data is collected. The glass transition temperature for the homopolymer is measured at the midpoint of the inflection using the half-height method.

The Fox calculation of the $T_g$ for a copolymer containing crosslinking monomers as polymerized units, is based on glass transition temperatures for the homopolymers formed from each crosslinking monomer wherein the homopolymer is not in the presence of ammonia or a primary amine. The glass transition temperature values for homopolymers formed from the anionic monomers are for anionic homopolymers in the acid form.

Weight average molecular weight (Mw) is determined by size exclusion chromatography using EasiCal PS-20 polystyrene standards supplied by Polymer Laboratories.

When we refer to "particle size," we mean weight average particle diameter of the emulsion (co)polymer particles as measured using a Brookhaven BI-90 Particle Sizer. Preferably the particle size of the emulsion polymers used to form films of this invention is from 30 to 500 nanometers, preferably 50 to 400 nanometers, more preferably 60 to 250, and most preferably 70 to 190 nanometers. Typically the refractive index of an acrylate polymer is lower than that of a methacrylate polymer. In a material containing acrylate and methacrylate component polymers, the difference in refractive index downgrades the optical properties of the material unless the particle size of the material is kept below 150 nanometers. Alternatively, the refractive index of the component polymers can be matched by copolymerization with monomers of either relatively high or low refractive index and the particle size of the material can be kept large. In some applications, instead of a clear material, a light diffusing material with high transmission is preferred. Component materials of different refractive indices can be made to scatter light forward with little light scattered backward to achieve high haze and transmission. Alternatively, a light scattering agent, either an organic or inorganic chemical compound, can also be added to a clear material to diffuse light.

"Swell ratio" is determined as follows: one part of (co)polymer in the form of either dried powder or emulsion is mixed with 50 parts of tetrahydrofuran in a container. The mixture is well agitated at 25° C. for eighteen hours. A Beckman Coulter Inc. ultracentrifuge operating at 30,000 rpm and 25° C. is used to separate the soluble polymer in solution from the insoluble polymer in swollen gel. The soluble fraction is decanted, leaving the "wet swollen insoluble polymer." The weight of the wet swollen insoluble polymer is measured. Then the wet swollen insoluble polymer is dried (e.g., under vacuum) to remove the tetrahydrofuran, and its dry weight is measured. The swell ratio is calculated thusly:

$$\text{Swell ratio} = \frac{\text{Weight of swollen insoluble polymer}}{\text{Weight of dry insoluble polymer}}$$

We measured the percent polymer insolubles for the tests described below. For those measurements, we weighed the dry polymer ("dry starting polymer") before it was dissolved in THF for the swell ratio test above, and after weighing the dried insoluble polymer for the swell ratio test, we calculate the weight percent insoluble polymer according to the following equation:

$$\text{Weight \% insoluble polymer} = \frac{\text{Weight of dried insoluble polymer}}{\text{Weight of dry starting polymer}} \times 100\%$$

$C_1$-$C_6$ alkyl acrylates include methylacrylate, ethylacrylate, n-propylacrylate, i-propylacrylate, sec-butylacrylate, i-butylacrylate, t-butylacrylate, cyclohexylacrylate, and phenylmrethacrylate $C_1$-$C_{12}$ alkylacrylates include the $C_1$-$C_6$ alkyl acrylates as well as Heptyl 2-heptylacrylate, 2-ethylhexylacrylate and dodecylacrylate.

The first, second and/or third components mentioned above can be polymerized from one or more alkyl acrylates as described above, or may also contain minor amounts of non-alkyl acrylate co-monomers. Suitable non-alkyl acrylate co-monomers include ethylenically unsaturated aromatic monomers including styrene, alkylstyrenes (e.g., methylstyrene and ethylstyrene), other substituted vinylbenzenes wherein the substitutents do not interfere with polymerization, vinyl polycyclic aromatic monomers, vinyl acetate, vinyl butyrate, vinyl caprolate; acrylonitrile, methacrylonitrile, butadiene, isoprene, vinyl chloride, vinylidene chloride, and the like.

When we mention a first or second component, we are not restricting ourselves to any order in which the synthesis of such components takes place. The second component may be made first in time, or vice versa. The same is true of the third component. We describe these components as first, second or third simply for convenience, not as a requirement that they be synthesized in any particular order.

The practice of emulsion polymerization is discussed in detail in D. C. Blackley, *Emulsion Polymerization* (Wiley, 1975) and also in H. Warson, *The Applications of Synthetic Resin Emulsions*, Chapter 2 (Ernest Benn Ltd., London 1972).

When forming (co)polymers useful in the films of this invention by polymerization of ethylenically unsaturated monomers, conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators (alternatively referred to as "oxidants" herein) coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

Chain transfer agents such as, for example, halogen compounds such as tetrabromomethane; allyl compounds; alcohols, or mercaptans such as alkyl thioglycolates, alkyl mercaptoalkanoates, and $C_4$-$C_{22}$ linear or branched alkyl mercaptans may be used to control the molecular weight of the polymers formed by the polymerization of ethylenically unsaturated monomers and/or to provide a different molecular weight distribution than would otherwise have been obtained with any free-radical-generating initiator(s). Specific examples include alkyl mercaptans such as n- and t-dodecyl mercaptans and hexanethiol; alcohols such as isopropanol, isobutanol, lauryl alcohol, and t-octyl alcohol; and halogenated compounds such as carbon tetrachloride, tetrachloroethylene, and trichlorbromoethane.

When redox reaction catalyzing metal salts are employed, the polymer component so produced may contain terminal unsaturations that when a later polymer component is polymerized in the presence of such terminal unsaturations, the later polymer component co-polymerizes to the unsaturations, resulting in two components that are covalently bound together. With non-metal chain transfer agents, components do not have to be covalently bonded in such a manner.

In one embodiment of the present invention, the first component mentioned above may be prepared by polymerizing a $C_1$ to $C_{12}$ alkylacrylate monomers in the presence of a free radical initiator and a catalytic transition metal chelate agent. Preferred are the transition metal chelate complexes disclosed in WO 02/22734, most preferably, the transition metal chelate complex is a cobalt (II) or (III) chelate complex, such as, for example, dioxime complexes of cobalt (II) or combinations thereof. These complexes may optionally include bridging groups such as BF2, and may also be optionally coordinated with ligands such as water, alcohols and the like. Additional suitable transition metal complexes are disclosed in for example U.S. Pat. Nos. 4,694,054, 5,770,665, 5,962, 609, and 5,602,220. A preferred cobalt chelate complex useful in the present invention is Co II 92,3-dioxyiminobutane-BF2)2, the Co III analogue of the aforementioned compound, or combinations thereof. The spatial arrangements of such complexes are disclosed in for example EP-A-199436 and U.S. Pat. No. 5,756,605. When the first component is made using a cobalt catalyst, it is preferred that the second component be polymerized in the presence of and subsequent to the first component.

One or more of the (co)polymeric components of this invention may optionally contain one or more cross-linking monomer(s). Suitable crosslinking monomers include those selected from multi-ethylenically unsaturated monomers in which the ethylenically unsaturated groups on each crosslinker have approximately equal reactivity; multi-ethylenically unsaturated monomers having two or more non-conjugated double bonds of differing reactivity; and combinations thereof. In some aspects of these embodiments, the multi-ethylenically unsaturated monomers in which the ethylenically unsaturated groups have approximately equal reactivity are selected from divinylbenzene; glycol di- and trimethacrylates and acrylates; and triol triacrylates and methacrylates. In some aspects of these embodiments, the crosslinking monomers are selected from butylene glycol diacrylates. In some aspects of these embodiments, the multi-ethylenically unsaturated monomers having two or more non-conjugated double bonds of differing reactivity are selected from allyl methacrylate; diallyl maleate and allyl acryloxypropionate.

In one embodiment of the present invention, the multi-component (co)polymer) is made by emulsion polymerization, it may be isolated as powders, or other solid particles, from dispersions containing it (e.g., aqueous emulsions) by methods well known in the art. These methods include, for example, spray drying, coagulation and oven drying, freeze drying, and devolatilizing extrusion.

Film of this invention can be prepared by forming and melt processing of multi-component (co)polymers. It may be melt processed as is, or in combination with additives as are described below. If additives are included, they may be combined with the acrylic polymer by blending methods well known to those skilled in the art. For example, a Henschel Blender (available from Henschel Mixers Americas, Houston, Tex.), may be used to blend the acrylic polymer with additives. Hand blending (e.g., by shaking the components of the acrylic polymer in a bag) may also be employed, as may be pre-extrusion to form pellets.

Conventional additives may be incorporated into the acrylic resin prior to melt processing. The additives include, for example, lubricants, stabilizers, and processing aids. The stabilizers serve to prevent the breakdown of the acrylic polymers due to thermal, ultraviolet light-stimulated oxidative degradation, mechanical degradation and discoloration. Other additives may include, for example, colorants, inorganic pigments, polymeric or inorganic fillers and particulate extenders. Furthermore, for agriculture application purposes, additives may include, for example, anti-dripping, anti-fogging, anti-fungal agents, ultraviolet light block agents, optionally, light diffusing agents or modifiers.

In the case that the film is multilayer, plasticizers suitable for use in the outer layers of the film of multilayer films of this invention could be both monomeric and polymeric ones which include but not limited to phthalate-based such as bis(2-ethylhexyl) phthalate (DEHP), diisononylphthalate (DINP), bis(n-butyl)phthalate (DNBP), butyl benzyl phthalate (BBzP), diisodecyl phthalate (DIDP), di-n-octyl phthalate (DOP), diethyl phthalate (DEP), butyl octyl phthalate (BOP), benzoates such as propylene glycol dibenzoate (PGDB), dipropylene glycol dibenzoate (DPGDB), diethylene glycol dizenzoate/dipropylene glycol dizenzoate, aliphatic dibasic acid esters such as di-2-ethylhexyl adipate (DEHA), dimethyl adipate (DMAD), diissoctyl adipate (DIOA), diisononyl adipate (DINA), monomethyl adipate (MMAD), maleate based such as dibutyl maleate (DBM), diisobutyl maleate (DIBM), trimellitates such as tri-2-ethylhexyl trimellitate (TOTM), triisooctyl trimellitate (TIOTM), trisiononyl trimellitate (TINTM), expoxidized vegetable oils, glycols, and polymeric plasticizers such as acrylic oligomers, etc.

Multilayer films of this invention can be made in several ways. One is a blown film method where the layers are co-extruded in tubular form, and the tube can be subsequently blown to form a larger bubble that is of film thickness. This blowing of the tube can be accomplished as the multilayer tube is exiting the extrusion die, in which case the blown tubular film is fed through nip rolls that rotate as a speed faster than the speed at which the tubular material exits the die so that the tube is stretched in the machine direction as the tube is being expanded in the transverse direction under air pressure. Typically, the expansion ratio between die annulus and diameter of the blown tube of film is 1.5 to 4 times the die diameter. The drawdown between the melt wall thickness and the cooled film thickness occurs in both radial and longitudinal directions and is easily controlled by changing the volume/pressure of air inside the bubble and by altering the haul off speed. This gives blown film a better balance of properties than traditional cast or extruded film which is drawn down along the extrusion direction only another advantage of blown film process is that it could produce films with large width dimension (great than 30 feet wide) which is required by agricultural tunnel application.

Another variation of this method is to form the tube, cool it, then reheat it under internal air pressure to trap a bubble between two pairs of nip rolls where one pair pulls the tube at a faster rate than the other pair feeds the tube into the place between the two pairs of nip rolls. This pulling stretches the tube in the machine direction as the air pressure causes the tube to expand in the transverse direction. In other words, the film can be blown in a single step as the tube is being extruded from the die, or it can be done in several stages, with the tube being expanded in several stages until a tubular film is produced.

As second method is similar to the first except that the tube is not completely co-extruded. Instead, one or more layers are extruded in tubular form and one or more layers are then extrusion coated onto the tube to form a multilayer tube that is blown to form a large bubble that is of film thickness. This blowing also can be done in several stages until a tubular film is produced.

Monolayer films of this invention can also be made according to these blown film methods The lay-flat tubular film produced by the blown film method once formed is then either kept as such or the edges of the lay-flat are slit off to produce two flat film sheets and wound up onto reels.

Another form of melt processing to make film is the cast film process that involves the extrusion of polymers melted through a slot or flat die to form a thin, molten sheet or film. This film is "pinned" to the surface of a chill roll (typically water-cooled and chrome-plated) by a blast of air from an air knife or vacuum box. The film quenches immediately and then has its edges slit prior to winding.

In one embodiment of the present invention, a single layer acrylic film can be made from a composition of present invention, or a blend of a composition of present invention with other acrylic compositions made from sequential polymerization process (for example, compositions disclosed in U.S. Pat. Nos. 4,141,935, 3,562,235, 3,843,753 and 3,812,205). The weight ratio of the blends of a composition of present invention with other acrylic compositions made from sequential polymerization process can range from 98:2 to 10:90, preferably 90:10 to 50:50.

In another embodiment of the present invention, a multilayer film could be made with an acrylic composition of present invention, or a blend of a composition of present invention with other acrylic compositions made from sequential polymerization process and a material other than acrylic compositions. Suitable materials include but not limited to thermal plastic urethane ("TPU") or polyvinyl butyral ("PVB"). We prefer that each of the acrylic layers be from about 20 to about 100 micrometer thick, and the non-acrylic layer be from about 20 to about 200 micrometer thick.

Thermoplastic polyurethane (TPU) is a polymer with diisocyanate component, polyol component, and chain extender produced by known method to possess urethane linkages in the main chain of the polymer molecule. Diisocyanate can be aliphatic type diisocyanate, cycloaliphatic diisocyanate, and aromatic type diisocyanate. Polyol contains active end hydrogen atoms and can be polyetherpolyol, polyesterpolyol, acrylic, styrene, vinyl addition and/or dispersion polyol. Chain extender is a low molecular weight diol such as aliphatic glycol, aromatic glycol, 1,4-butanediol, 1,6-hexanediol, and bis(hydroxyethyl)hydroquinone.

Polyvinyl butyral (PVB) is an optically transparent polymer. It is produced by reacting polyvinyl alcohol (PVOH) with butyraldehyde usually in an aqueous medium under acidic conditions. The reaction mixture is neutralized and PVB polymer is isolated, stabilized, and dried. The polymer typically comprises 12 to 25 weight % hydroxyl (OH) groups (calculated as polyvinyl alcohol (PVOH)), and preferably 15 to 20 weight % OH groups as PVOH. In addition, the polymer optionally comprises 0.1 to 10 weight % residual ester (COOR) groups calculated as polyvinyl ester, for example, acetate; and preferably 0.1 to 3 weight % COOR groups where R is a lower alkyl group. The remainder of the polymer is acetal, preferably butyraldehyde acetal, but optionally including small amounts of other acetal groups, for example, 2-ethyl hexanal group.

Typically, PVB polymer has a weight average molecular weight greater than 70,000. Suitable plasticizers commonly used to improve the flexibility of other rigid plastics could also be incorporated in PVB polymer.

Films of this invention can be used for a variety of different purposes, particularly for outdoors. One use is to replace PVC or polyethylene films that are commonly used in agriculture or construction (e.g., on greenhouses or similar structures). Other potential uses is where the film of this invention is laminated to (e.g., by co-extrusion with or extrusion coating onto) another flexible material, for example, EPDM flexible roofing material, in which case, the acrylic films of this invention can provide enhanced weather resistance and/or mechanical properties to the roofing membrane. Other uses of melt processed film of this invention include packaging, decorative and protective capping, printing and graphic, wrapping, etc. The following examples include (co)polymers useful in this invention as well as films representative of this invention.

EXAMPLE 1

This example illustrates the preparation of an acrylic prepolymer in an aqueous emulsion. The following mixtures were prepared with deionized water:

| Mixture | Component | Parts by Weight |
|---|---|---|
| A | Water | 54.24 |
| B | 32.53% Sodium C12-14 fatty alcohol polyglycol ether sulfate | 0.80 |
| | 32.78% Preformed aqueous emulsion of poly(n-butyl acrylate) at particle size of 43 nm | 9.33 |
| | Water | 1.97 |
| C | Sodium persulfate | 0.5457 |
| | Water | 2.63 |
| D | Methyl methacrylate | 18.40 |
| | Ethyl acrylate | 1.60 |
| | Co(II)-(2,3-dioxyiminobutane-BF$_2$)$_2$ | 0.0160 |
| | 32.53% Aqueous sodium C12-14 fatty alcohol polyglycol ether sulfate | 0.29 |
| | Water | 9.53 |
| E | Methyl methacrylate | 73.60 |
| | Ethyl acrylate | 6.40 |
| | Co(II)-(2,3-dioxyiminobutane-BF$_2$)$_2$ | 0.0080 |

-continued

| Mixture | Component | Parts by Weight |
|---|---|---|
| | 32.53% Aqueous sodium C12-14 fatty alcohol polyglycol ether sulfate | 1.27 |
| | Water | 40.76 |

A reactor equipped with stirrer and condenser and blanked with nitrogen was charged with Mixture A and heated to 80° C. When the temperature reached 80° C., Mixture B was charged into the reactor. To the stirred reactor contents was added Mixture C and heated for 20 minutes. Mixture D was homogenized with a Cyclone I.Q.$^2$ homogenizer before gradually added into the reactor in 20 minutes. Mixture E was then homogenized with a Cyclone I.Q.$^2$ homogenizer and gradually added into the reactor in 120 minutes. Heating and stirring were continued for 60 minutes before the reactor was cooled to ambient temperature. The particle size of the resulting emulsion was 157 nm as measured by a Brookhaven Instruments particle size analyzer BI-90.

EXAMPLE 2

This example illustrates the preparation of an acrylic polymer in an aqueous emulsion. The following mixtures were prepared with deionized water:

| Mixture | Component | Parts by Weight |
|---|---|---|
| A | Water | 200.00 |
| B | 47.15% Acrylic pre-polymer from Example 1 | 90.90 |
| C | n-Butyl acrylate | 100.00 |
| | 32.53% Aqueous sodium C12-14 fatty alcohol polyglycol ether sulfate | 2.20 |
| | Water | 25.00 |
| D | 2% Aqueous copper(II) nitrate hemipentahydrate | 0.0025 |
| | Water | 2.00 |
| E | 2% Aqueous iron(II) sulfate heptahydrate | 0.0075 |
| | Water | 2.00 |
| F | Water | 8.05 |
| | 50% Aqueous sodium hydroxide | 0.0280 |
| | Sodium hydrosulfite | 0.1290 |
| G | Sodium persulfate | 0.1000 |
| | Water | 8.05 |
| H | 85% t-Amyl hydroperoxide | 0.1176 |
| | Water | 5.00 |
| I | Water | 2.00 |
| | 34.7% Aqueous tetrasodium 1-hydroxyethylidene-1,1-phosphonate | 0.0173 |

A reactor equipped with stirrer and condenser was charged with Mixture A and heated to 40° C. With stirring the air in the reactor was replaced with nitrogen. Mixtures B and C were charged into the reactor and the oxygen content in the reactor was further reduced to below 4 ppm. Mixtures D, E, and F were then charged into the reactor and mixed well before Mixture G was charged into the reactor at 40° C. An exothermic polymerization took place and the reactor was held at peak temperature for 15 minutes before cooling it to 70° C. One half of Mixture H was added into the reactor, and the heating and stirring were continued for 30 minutes. The other one half of Mixture H and all of Mixture I were added into the reactor while the reactor was gradually cooled to ambient temperature. The particle size of the resulting emulsion was 236 nm as measured by a Brookhaven Instruments particle size analyzer BI-90.

EXAMPLE 3

This example illustrates the preparation of an acrylic polymer in an aqueous emulsion. The following mixtures were prepared with deionized water:

| Mixture | Component | Parts by Weight |
|---|---|---|
| A | Water | 200.00 |
| B | 47.15% Acrylic pre-polymer from Example 1 | 90.90 |
| C | n-Butyl acrylate | 100.00 |
| | 32.53% sodium C12-14 fatty alcohol polyglycol ether sulfate | 2.20 |
| | Water | 25.00 |
| D | 2% Aqueous copper(II) nitrate hemipentahydrate | 0.0025 |
| | Water | 2.00 |
| E | 2% Aqueous iron(II) sulfate heptahydrate | 0.0075 |
| | Water | 2.00 |
| F | Water | 8.05 |
| | 50% Aqueous sodium hydroxide | 0.0280 |
| | Sodium hydrosulfite | 0.1290 |
| G | Sodium persulfate | 0.1000 |
| | Water | 10.06 |
| H | 85% t-Amyl hydroperoxide | 0.1176 |
| | Water | 6.25 |
| I | Water | 2.50 |
| | 34.7% Aqueous tetrasodium 1-hydroxyethylidene-1,1-phosphonate | 0.0173 |

A reactor equipped with stirrer and condenser was charged with Mixture A and heated to 40° C. With stirring the air in the reactor was replaced with nitrogen. Mixtures B and C were charged into the reactor and the oxygen content in the reactor was further reduced to below 4 ppm. Mixtures D, E, and F were then charged into the reactor and mixed well before Mixture G was charged into the reactor at 40° C. An exothermic polymerization took place and the reactor was held at peak temperature for 15 minutes before cooling it to 70° C. One half of Mixture H was added into the reactor, and the heating and stirring were continued for 30 minutes. The other one half of Mixture H and all of Mixture I were added into the reactor while the reactor was gradually cooled to ambient temperature. The particle size of the resulting emulsion was 236 nm as measured by a Brookhaven Instruments particle size analyzer BI-90.

EXAMPLE 4

This example illustrates the preparation of an acrylic polymer in an aqueous emulsion. The following mixtures were prepared with deionized water:

| Mixture | Component | Parts by Weight |
|---|---|---|
| A | 47.15% Acrylic pre-polymer from Example 1 | 90.89 |
| | Water | 112.04 |
| B | Ethyl acrylate | 100.00 |
| | Sodium carbonate | 0.0339 |
| | 23.40% Aqueous sodium dodecylbenzenesulfonate | 3.42 |
| | Water | 68.40 |
| C | Sodium persulfate | 0.0600 |
| | Water | 19.55 |

A reactor equipped with stirrer and condenser and blanked with nitrogen was charged with Mixture A and heated to 80° C. Mixtures B and C were gradually added into the reactor in 120 minutes. After the addition was completed, the heating and stirring were continued for 30 minutes before the reactor was cooled to ambient temperature. The particle size of the resulting emulsion was 232 nm as measured by a Brookhaven Instruments particle size analyzer BI-90.

EXAMPLE 5

This example illustrates the preparation of an acrylic pre-polymer in an aqueous emulsion. The following mixtures were prepared with deionized water:

| Mixture | Component | Parts by Weight |
|---|---|---|
| A | Water | 174.42 |
|   | 23.40% Aqueous sodium dodecylbenzenesulfonate | 0.27 |
| B | Methyl methacrylate | 99.85 |
|   | n-Dodecylmercaptan | 0.1536 |
|   | Sodium carbonate | 0.0102 |
|   | 23.40% Aqueous sodium dodecylbenzenesulfonate | 1.83 |
|   | Water | 35.90 |
| C | Sodium persulfate | 0.0600 |
|   | Water | 6.21 |

A reactor equipped with stirrer and condenser and blanked with nitrogen was charged with Mixture A. Into the stirred reactor heated to 81° C. were added 15% of Mixtures B and 20% of Mixture C. After an exothermic polymerization took place and the reactor reached peak temperature, the heating and stirring were continued at 81° C. for 10 minutes. The remaining Mixtures B and C were then gradually added into the reactor in 60 minutes. After the addition was completed, the reactor was kept at 81° C. for 30 minutes before cooling to ambient temperature. The particle size of the resulting emulsion was 183 nm as measured by a Brookhaven Instruments particle size analyzer BI-90.

EXAMPLE 6

This example illustrates the preparation of an acrylic polymer in an aqueous emulsion. The following mixtures were prepared with deionized water:

| Mixture | Component | Parts by Weight |
|---|---|---|
| A | Water | 162.50 |
| B | 31.13% Acrylic pre-polymer from Example 5 | 137.68 |
| C | n-Butyl acrylate | 100.00 |
|   | 32.53% Sodium C12-14 fatty alcohol polyglycol ether sulfate | 2.20 |
|   | Water | 31.25 |
| D | 2% Aqueous copper(II) nitrate hemipentahydrate | 0.0025 |
|   | Water | 2.50 |
| E | 2% Aqueous iron(II) sulfate heptahydrate | 0.0075 |
|   | Water | 2.50 |
| F | Water | 10.06 |
|   | 50% Aqueous sodium hydroxide | 0.0280 |
|   | Sodium hydrosulfite | 0.1290 |
| G | Sodium persulfate | 0.1000 |
|   | Water | 10.06 |
| H | 85% t-Amyl hydroperoxide | 0.1176 |
|   | Water | 6.25 |
| I | Water | 2.50 |
|   | 34.7% Aqueous tetrasodium 1-hydroxyethylidene-1,1-phosphonate | 0.0173 |

A reactor equipped with stirrer and condenser was charged with Mixture A and heated to 40° C. With stirring the air in the reactor was replaced with nitrogen. Mixtures B and C were charged into the reactor and the oxygen content in the reactor was further reduced to below 4 ppm. Mixtures D, E, and F were then charged into the reactor and mixed well before Mixture G was charged into the reactor at 40° C. An exothermic polymerization took place and the reactor was held at peak temperature for 15 minutes before cooling it to 70° C. One half of Mixture H was added into the reactor, and the heating and stirring were continued for 30 minutes. The other one half of Mixture H and all of Mixture I were added into the reactor while the reactor was gradually cooled to ambient temperature. The particle size of the resulting emulsion was 271 nm as measured by a Brookhaven Instruments particle size analyzer BI-90.

EXAMPLE 7

This example illustrates the preparation of an acrylic pre-polymer in an aqueous emulsion. The following mixtures were prepared with deionized water:

| Mixture | Component | Parts by Weight |
|---|---|---|
| A | Water | 171.70 |
|   | 23.40% Aqueous sodium dodecylbenzenesulfonate | 0.27 |
| B | Methyl methacrylate | 99.93 |
|   | n-Dodecylmercaptan | 0.0750 |
|   | Sodium carbonate | 0.0102 |
|   | 23.40% Aqueous sodium dodecylbenzenesulfonate | 1.83 |
|   | Water | 33.18 |
| C | Sodium persulfate | 0.0600 |
|   | Water | 4.64 |

A reactor equipped with stirrer and condenser and blanked with nitrogen was charged with Mixture A. Into the stirred reactor heated to 81° C. were added 15% of Mixtures B and 20% of Mixture C. After an exothermic polymerization took place and the reactor reached peak temperature, the heating and stirring were continued at 81° C. for 10 minutes. The remaining Mixtures B and C were then gradually added into the reactor in 60 minutes. After the addition was completed, the reactor was kept at 81° C. for 30 minutes before cooling to ambient temperature. The particle size of the resulting emulsion was 197 nm as measured by a Brookhaven Instruments particle size analyzer BI-90.

EXAMPLE 8

This example illustrates the preparation of an acrylic polymer in an aqueous emulsion. The following mixtures were prepared with deionized water:

| Mixture | Component | Parts by Weight |
|---|---|---|
| A | 31.93% Acrylic pre-polymer from Example 7 | 187.92 |
|   | Water | 194.17 |
| B | Sodium persulfate | 0.0600 |
|   | Water | 30.58 |
| C | Ethyl acrylate | 99.95 |
|   | n-Dodecylmercaptan | 0.0500 |
|   | Sodium carbonate | 0.0339 |
|   | 23.40% Aqueous sodium dodecylbenzenesulfonate | 3.42 |
|   | Water | 74.56 |

A reactor equipped with stirrer and condenser and blanked with nitrogen was charged with Mixture A and heated to 80° C. Mixtures B and C were gradually added into the reactor in 120 minutes. After the addition was completed, the heating and stirring were continued for 30 minutes before the reactor was cooled to ambient temperature. The particle size of the resulting emulsion was 251 nm as measured by a Brookhaven Instruments particle size analyzer BI-90.

EXAMPLE 9

This example illustrates the preparation of a 2-stage acrylic polymer in an aqueous emulsion. The following mixtures were prepared with deionized water:

| Mixture | Component | Parts by Weight |
|---|---|---|
| | Stage I | |
| A | Water | 163.52 |
| | 23.40% Aqueous sodium dodecylbenzenesulfonate | 0.0859 |
| B | Ethyl acrylate | 62.47 |
| | n-Dodecylmercaptan | 0.0313 |
| | Sodium carbonate | 0.0063 |
| | 23.40% Aqueous sodium dodecylbenzenesulfonate | 1.15 |
| | Water | 26.53 |
| C | Sodium persulfate | 0.0375 |
| | Water | 7.93 |
| | Stage II | |
| D | Methyl methacrylate | 37.47 |
| | n-Dodecylmercaptan | 0.0281 |
| | Sodium carbonate | 0.0127 |
| | 23.40% Aqueous sodium dodecylbenzenesulfonate | 1.28 |
| | Water | 12.65 |
| E | Sodium persulfate | 0.0225 |
| | Water | 5.70 |
| F | Sodium persulfate | 0.0113 |
| | Water | 4.36 |

A reactor equipped with stirrer and condenser and blanked with nitrogen was charged with Mixture A. Into the stirred reactor heated to 77° C. were added 7.5% of Mixtures B and 20% of Mixture C. After an exothermic polymerization took place and the reactor reached peak temperature, the heating and stirring were continued at 80° C. for 10 minutes. The remaining Mixtures B and C were gradually added into the reactor in 85 minutes. After the addition was completed, the reactor was kept at 80° C. for 30 minutes. The particle size of the emulsion was 169 nm as measured by a Brookhaven Instruments particle size analyzer BI-90. Mixtures D and E were then gradually added into the reactor in 85 minutes. After the addition was completed, the reactor was raised to 85° C. Mixture F was gradually added into the reactor in 30 minutes before the reactor temperature was lowered to 80° C. The stirring and heating at 80° C. were continued for another 30 minutes before cooling the reactor to ambient temperature. The particle size of the resulting emulsion was 190 nm as measured by a Brookhaven Instruments particle size analyzer BI-90.

EXAMPLE 10

This example illustrates the preparation of a 2-stage acrylic polymer in an aqueous emulsion. The following mixtures were prepared with deionized water:

| Mixture | Component | Parts by Weight |
|---|---|---|
| | Stage I | |
| A | Water | 163.52 |
| | 23.40% Aqueous sodium dodecylbenzenesulfonate | 0.0962 |
| B | Ethyl acrylate | 70.00 |
| | Sodium carbonate | 0.0071 |
| | 23.40% Aqueous sodium dodecylbenzenesulfonate | 1.28 |
| | Water | 28.40 |
| C | Sodium persulfate | 0.0420 |
| | Water | 8.27 |
| | Stage II | |
| D | Methyl methacrylate | 29.96 |
| | n-Dodecylmercaptan | 0.0450 |
| | Sodium carbonate | 0.0102 |
| | 23.40% Aqueous sodium dodecylbenzenesulfonate | 0.55 |
| | Water | 10.77 |
| E | Sodium persulfate | 0.0180 |
| | Water | 5.43 |
| F | Sodium persulfate | 0.0090 |
| | Water | 4.36 |

A reactor equipped with stirrer and condenser and blanked with nitrogen was charged with Mixture A. Into the stirred reactor heated to 80° C. were added 7.5% of Mixtures B and 20% of Mixture C. After an exothermic polymerization took place and the reactor reached peak temperature, the heating and stirring were continued at 80° C. for 10 minutes. The remaining Mixtures B and C were gradually added into the reactor in 90 minutes. After the addition was completed, the reactor was kept at 80° C. for 30 minutes. The particle size of the emulsion was 174 nm as measured by a Brookhaven Instruments particle size analyzer BI-90. Mixtures D and E were then gradually added into the reactor in 85 minutes. After the addition was completed, the reactor was raised to 85° C. Mixture F was gradually added into the reactor in 30 minutes before the reactor temperature was lowered to 80° C. The stirring and heating at 80° C. were continued for another 30 minutes before cooling the reactor to ambient temperature. The particle size of the resulting emulsion was 192 nm as measured by a Brookhaven Instruments particle size analyzer BI-90.

EXAMPLE 11

This example illustrates the preparation of a 2-stage acrylic polymer in an aqueous emulsion. The following mixtures were prepared with deionized water:

| Mixture | Component | Parts by Weight |
|---|---|---|
| | Stage I | |
| A | Water | 163.52 |
| | 23.40% Aqueous sodium dodecylbenzenesulfonate | 0.0962 |
| B | Ethyl acrylate | 69.86 |
| | Allyl Methacrylate | 0.1400 |
| | Sodium carbonate | 0.0071 |
| | 23.40% Aqueous sodium dodecylbenzenesulfonate | 1.28 |
| | Water | 28.40 |
| C | Sodium persulfate | 0.0420 |
| | Water | 8.27 |
| | Stage II | |
| D | Methyl methacrylate | 29.96 |
| | n-Dodecylmercaptan | 0.0450 |

-continued

| Mixture | Component | Parts by Weight |
|---|---|---|
| | Sodium carbonate | 0.0102 |
| | 23.40% Aqueous sodium dodecylbenzenesulfonate | 0.55 |
| | Water | 10.77 |
| E | Sodium persulfate | 0.0180 |
| | Water | 5.43 |
| F | Sodium persulfate | 0.0090 |
| | Water | 4.36 |

A reactor equipped with stirrer and condenser and blanked with nitrogen was charged with Mixture A. Into the stirred reactor heated to 80° C. were added 7.5% of Mixtures B and 20% of Mixture C. After an exothermic polymerization took place and the reactor reached peak temperature, the heating and stirring were continued at 80° C. for 10 minutes. The remaining Mixtures B and C were gradually added into the reactor in 90 minutes. After the addition was completed, the reactor was kept at 80° C. for 30 minutes. The particle size of the emulsion was 174 nm as measured by a Brookhaven Instruments particle size analyzer BI-90. Mixtures D and E were then gradually added into the reactor in 85 minutes. After the addition was completed, the reactor was raised to 85° C. Mixture F was gradually added into the reactor in 30 minutes before the reactor temperature was lowered to 80° C. The stirring and heating at 80° C. were continued for another 30 minutes before cooling the reactor to ambient temperature. The particle size of the resulting emulsion was 192 nm as measured by a Brookhaven Instruments particle size analyzer BI-90.

EXAMPLE 12

This example illustrates the preparation of a 3-stage acrylic polymer in an aqueous emulsion. The following mixtures were prepared with deionized water:

| Mixture | Component | Parts by Weight |
|---|---|---|
| Stage I | | |
| A | Water | 130.82 |
| | 23.40% Aqueous sodium dodecylbenzenesulfonate | 0.0980 |
| B | Methyl methacrylate | 35.63 |
| | Sodium carbonate | 0.0036 |
| | 23.40% Aqueous sodium dodecylbenzenesulfonate | 0.65 |
| | Water | 17.63 |
| C | Sodium persulfate | 0.0214 |
| | Water | 4.99 |
| Stage II | | |
| D | Ethyl acrylate | 59.38 |
| | Sodium carbonate | 0.0201 |
| | 23.40% Aqueous sodium dodecylbenzenesulfonate | 2.03 |
| | Water | 17.46 |
| E | Sodium persulfate | 0.0356 |
| | Water | 5.20 |
| F | Sodium persulfate | 0.0071 |
| | Water | 3.49 |
| Stage III | | |
| G | Methyl methacrylate | 5.00 |
| | n-Dodecylmercaptan | 0.0038 |
| | Sodium carbonate | 0.0005 |
| | 23.40% Aqueous sodium dodecylbenzenesulfonate | 0.21 |
| | Water | 3.87 |
| H | Sodium persulfate | 0.0030 |
| | Water | 3.49 |

| Mixture | Component | Parts by Weight |
|---|---|---|
| I | Sodium persulfate | 0.0071 |
| | Water | 3.49 |

A reactor equipped with stirrer and condenser and blanked with nitrogen was charged with Mixture A. Into the stirred reactor heated to 80° C. were added 15% of Mixture B and 20% of Mixture C. After an exothermic polymerization took place and the reactor reached peak temperature, the heating and stirring were continued at 80° C. for 10 minutes. The remaining Mixtures B and C were gradually added into the reactor in 60 minutes. After the addition was completed, the reactor was kept at 80° C. for 30 minutes. The particle size of the emulsion was 183 nm as measured by a Brookhaven Instruments particle size analyzer BI-90. Mixtures D and E were gradually added into the reactor in 100 minutes. After the addition was completed, the reactor was raised to 85° C. Mixture F was gradually added into the reactor in 30 minutes before the reactor temperature was lowered to 80° C. The stirring and heating at 80° C. were continued for another 30 minutes. The particle size of the resulting emulsion was 242 nm as measured by a Brookhaven Instruments particle size analyzer BI-90. Mixtures G and H were then gradually added into the reactor in 100 minutes. After the addition was completed, the reactor was raised to 85° C. Mixture I was gradually added into the reactor in 30 minutes before the reactor temperature was lowered to 80° C. The stirring and heating at 80° C. were continued for another 30 minutes before cooling the reactor to ambient temperature. The particle size of the resulting emulsion was 247 nm as measured by a Brookhaven Instruments particle size analyzer BI-90.

EXAMPLE 13

This example illustrates the preparation of a 2-stage acrylic polymer in an aqueous emulsion. The following mixtures were prepared with deionized water:

| Mixture | Component | Parts by Weight |
|---|---|---|
| Stage I | | |
| A | Water | 153.48 |
| | 23.40% Aqueous sodium dodecylbenzenesulfonate | 0.0968 |
| B | Methyl methacrylate | 35.18 |
| | Allyl methacrylate | 0.0176 |
| | Sodium carbonate | 0.0036 |
| | 23.40% Aqueous sodium dodecylbenzenesulfonate | 0.65 |
| | Water | 16.47 |
| C | Sodium persulfate | 0.0211 |
| | Water | 4.39 |
| Stage II | | |
| D | Ethyl acrylate | 58.66 |
| | Sodium carbonate | 0.0199 |
| | 23.40% Aqueous sodium dodecylbenzenesulfonate | 2.01 |
| | Water | 16.97 |
| E | Sodium persulfate | 0.0352 |
| | Water | 4.57 |
| F | Sodium persulfate | 0.0176 |
| | Water | 3.07 |

A reactor equipped with stirrer and condenser and blanked with nitrogen was charged with Mixture A. Into the stirred reactor heated to 80° C. were added 15% of Mixtures B and 20% of Mixture C. After an exothermic polymerization took place and the reactor reached peak temperature, the heating and stirring were continued at 80° C. for 10 minutes. The remaining Mixtures B and C were gradually added into the reactor in 60 minutes. After the addition was completed, the reactor was kept at 80° C. for 30 minutes. The particle size of the emulsion was 175 nm as measured by a Brookhaven Instruments particle size analyzer BI-90. Mixtures D and E were gradually added into the reactor in 100 minutes. After the addition was completed, the reactor was raised to 85° C. Mixture F was gradually added into the reactor in 30 minutes before the reactor temperature was lowered to 80° C. The stirring and heating at 80° C. were continued for another 30 minutes before cooling the reactor to ambient temperature. The particle size of the resulting emulsion was 241 nm as measured by a Brookhaven Instruments particle size analyzer BI-90.

EXAMPLE 14

This example illustrates the preparation of a 2-stage acrylic polymer in an aqueous emulsion. The following mixtures were prepared with deionized water:

| Mixture | Component | Parts by Weight |
|---|---|---|
| | Stage I | |
| A | Water | 153.48 |
| | 23.40% Aqueous sodium dodecylbenzenesulfonate | 0.0968 |
| B | Methyl methacrylate | 35.20 |
| | Sodium carbonate | 0.0036 |
| | 23.40% Aqueous sodium dodecylbenzenesulfonate | 0.65 |
| | Water | 16.47 |
| C | Sodium persulfate | 0.0211 |
| | Water | 4.39 |
| | Stage II | |
| D | Ethyl acrylate | 58.63 |
| | Allyl methacrylate | 0.0293 |
| | Sodium carbonate | 0.0199 |
| | 23.40% Aqueous sodium dodecylbenzenesulfonate | 2.01 |
| | Water | 16.97 |
| E | Sodium persulfate | 0.0352 |
| | Water | 4.57 |
| F | Sodium persulfate | 0.0176 |
| | Water | 3.07 |

A reactor equipped with stirrer and condenser and blanked with nitrogen was charged with Mixture A. Into the stirred reactor heated to 80° C. were added 15% of Mixtures B and 20% of Mixture C. After an exothermic polymerization took place and the reactor reached peak temperature, the heating and stirring were continued at 80° C. for 10 minutes. The remaining Mixtures B and C were gradually added into the reactor in 60 minutes. After the addition was completed, the reactor was kept at 80° C. for 30 minutes. The particle size of the emulsion was 172 nm as measured by a Brookhaven Instruments particle size analyzer BI-90. Mixtures D and E were gradually added into the reactor in 100 minutes. After the addition was completed, the reactor was raised to 85° C. Mixture F was gradually added into the reactor in 30 minutes before the reactor temperature was lowered to 80° C. The stirring and heating at 80° C. were continued for another 30 minutes before cooling the reactor to ambient temperature. The particle size of the resulting emulsion was 233 nm as measured by a Brookhaven Instruments particle size analyzer BI-90.

EXAMPLE 15

This example illustrates the preparation of a 2-stage acrylic polymer in an aqueous emulsion. The following mixtures were prepared with deionized water:

| Mixture | Component | Parts by Weight |
|---|---|---|
| | Stage I | |
| A | Water | 153.48 |
| | 23.40% Aqueous sodium dodecylbenzenesulfonate | 0.0968 |
| B | Methyl methacrylate | 35.18 |
| | Allyl methacrylate | 0.0176 |
| | Sodium carbonate | 0.0036 |
| | 23.40% Aqueous sodium dodecylbenzenesulfonate | 0.65 |
| | Water | 16.47 |
| C | Sodium persulfate | 0.0211 |
| | Water | 4.39 |
| | Stage II | |
| D | Ethyl acrylate | 58.63 |
| | Allyl methacrylate | 0.0293 |
| | Sodium carbonate | 0.0199 |
| | 23.40% Aqueous sodium dodecylbenzenesulfonate | 2.01 |
| | Water | 16.97 |
| E | Sodium persulfate | 0.0352 |
| | Water | 4.57 |
| F | Sodium persulfate | 0.0176 |
| | Water | 3.07 |

A reactor equipped with stirrer and condenser and blanked with nitrogen was charged with Mixture A. Into the stirred reactor heated to 80° C. were added 15% of Mixtures B and 20% of Mixture C. After an exothermic polymerization took place and the reactor reached peak temperature, the heating and stirring were continued at 80° C. for 10 minutes. The remaining Mixtures B and C were gradually added into the reactor in 60 minutes. After the addition was completed, the reactor was kept at 80° C. for 30 minutes. The particle size of the emulsion was 173 nm as measured by a Brookhaven Instruments particle size analyzer BI-90. Mixtures D and E were gradually added into the reactor in 100 minutes. After the addition was completed, the reactor was raised to 85° C. Mixture F was gradually added into the reactor in 30 minutes before the reactor temperature was lowered to 80° C. The stirring and heating at 80° C. were continued for another 30 minutes before cooling the reactor to ambient temperature. The particle size of the resulting emulsion was 240 nm as measured by a Brookhaven Instruments particle size analyzer BI-90.

EXAMPLE 16

This example illustrates the preparation of a 2-stage acrylic polymer in an aqueous emulsion. The following mixtures were prepared with deionized water:

| Mixture | Component | Parts by Weight |
|---|---|---|
| | Stage I | |
| A | Water | 153.48 |
| | 23.40% Aqueous sodium dodecylbenzenesulfonate | 0.0968 |
| B | Methyl methacrylate | 35.13 |
| | Allyl methacrylate | 0.0704 |
| | Sodium carbonate | 0.0036 |

-continued

| Mixture | Component | Parts by Weight |
|---|---|---|
| | 23.40% Aqueous sodium dodecylbenzenesulfonate | 0.65 |
| | Water | 16.47 |
| C | Sodium persulfate | 0.0211 |
| | Water | 4.39 |
| | Stage II | |
| D | Ethyl acrylate | 58.55 |
| | Allyl methacrylate | 0.1173 |
| | Sodium carbonate | 0.0199 |
| | 23.40% Aqueous sodium dodecylbenzenesulfonate | 2.01 |
| | Water | 16.97 |
| E | Sodium persulfate | 0.0352 |
| | Water | 4.57 |
| F | Sodium persulfate | 0.0176 |
| | Water | 3.07 |

A reactor equipped with stirrer and condenser and blanked with nitrogen was charged with Mixture A. Into the stirred reactor heated to 80° C. were added 15% of Mixtures B and 20% of Mixture C. After an exothermic polymerization took place and the reactor reached peak temperature, the heating and stirring were continued at 80° C. for 10 minutes. The remaining Mixtures B and C were gradually added into the reactor in 60 minutes. After the addition was completed, the reactor was kept at 80° C. for 30 minutes. The particle size of the emulsion was 175 nm as measured by a Brookhaven Instruments particle size analyzer BI-90. Mixtures D and E were gradually added into the reactor in 100 minutes. After the addition was completed, the reactor was raised to 85° C. Mixture F was gradually added into the reactor in 30 minutes before the reactor temperature was lowered to 80° C. The stirring and heating at 80° C. were continued for another 30 minutes before cooling the reactor to ambient temperature. The particle size of the resulting emulsion was 240 nm as measured by a Brookhaven Instruments particle size analyzer BI-90.

EXAMPLE 17

This example illustrates the preparation of a 3-stage acrylic polymer in an aqueous emulsion. The following mixtures were prepared with deionized water:

| Mixture | Component | Parts by Weight |
|---|---|---|
| | Stage I | |
| A | Water | 130.82 |
| | 23.40% Aqueous sodium dodecylbenzenesulfonate | 0.0962 |
| B | Methyl methacrylate | 15.00 |
| | Allyl methacrylate | 0.0038 |
| | Sodium carbonate | 0.0015 |
| | 23.40% Aqueous sodium dodecylbenzenesulfonate | 0.27 |
| | Water | 12.47 |
| C | Sodium persulfate | 0.0090 |
| | Water | 3.48 |
| | Stage II | |
| D | Ethyl acrylate | 64.98 |
| | Allyl methacrylate | 0.0163 |
| | Sodium carbonate | 0.0220 |
| | 23.40% Aqueous sodium dodecylbenzenesulfonate | 2.22 |
| | Water | 18.87 |
| E | Sodium persulfate | 0.0390 |
| | Water | 4.76 |

-continued

| Mixture | Component | Parts by Weight |
|---|---|---|
| F | Sodium persulfate | 0.0078 |
| | Water | 3.49 |
| | Stage III | |
| G | Methyl methacrylate | 19.99 |
| | n-Dodecylmercaptan | 0.0150 |
| | Sodium carbonate | 0.0020 |
| | 23.40% Aqueous sodium dodecylbenzenesulfonate | 0.86 |
| | Water | 7.62 |
| H | Sodium persulfate | 0.0120 |
| | Water | 2.17 |
| I | Sodium persulfate | 0.0078 |
| | Water | 3.49 |

A reactor equipped with stirrer and condenser and blanked with nitrogen was charged with Mixture A. Into the stirred reactor heated to 80° C. were added 35% of Mixtures B and 50% of Mixture C. After an exothermic polymerization took place and the reactor reached peak temperature, the heating and stirring were continued at 80° C. for 10 minutes. The remaining Mixtures B and C were gradually added into the reactor in 20 minutes. After the addition was completed, the reactor was kept at 80° C. for 30 minutes. The particle size of the emulsion was 137 nm as measured by a Brookhaven Instruments particle size analyzer BI-90. Mixtures D and E were gradually added into the reactor in 90 minutes. After the addition was completed, the reactor was raised to 85° C. Mixture F was gradually added into the reactor in 30 minutes before the reactor temperature was lowered to 80° C. The stirring and heating at 80° C. were continued for another 30 minutes. The particle size of the resulting emulsion was 227 nm as measured by a Brookhaven Instruments particle size analyzer BI-90. Mixtures G and H were then gradually added into the reactor in 30 minutes. After the addition was completed, the reactor was raised to 85° C. Mixture I was gradually added into the reactor in 30 minutes before the reactor temperature was lowered to 80° C. The stirring and heating at 80° C. were continued for another 30 minutes before cooling the reactor to ambient temperature. The particle size of the resulting emulsion was 242 nm as measured by a Brookhaven Instruments particle size analyzer BI-90.

EXAMPLE 18

This example illustrates the preparation of a 3-component acrylic polymer in an aqueous emulsion. The following mixtures were prepared with deionized water:

| Mixture | Component | Parts by Weight |
|---|---|---|
| | Component I | |
| A | Water | 130.82 |
| | 23.40% Aqueous sodium dodecylbenzenesulfonate | 1.8462 |
| B | Methyl methacrylate | 24.99 |
| | Allyl methacrylate | 0.0063 |
| | Sodium carbonate | 0.0025 |
| | 23.40% Aqueous sodium dodecylbenzenesulfonate | 0.85 |
| | Water | 14.97 |

-continued

| Mixture | Component | Parts by Weight |
|---------|-----------|-----------------|
| C | Sodium persulfate | 0.0150 |
|   | Water | 3.91 |
| *Component II* | | |
| D | Ethyl acrylate | 59.99 |
|   | Allyl methacrylate | 0.0150 |
|   | Sodium carbonate | 0.0203 |
|   | 23.40% Aqueous sodium dodecylbenzenesulfonate | 1.10 |
|   | Water | 17.62 |
| E | Sodium persulfate | 0.0360 |
|   | Water | 4.76 |
| F | Sodium persulfate | 0.0072 |
|   | Water | 3.49 |
| *Component III* | | |
| G | Methyl methacrylate | 14.99 |
|   | n-Dodecylmercaptan | 0.0113 |
|   | Sodium carbonate | 0.0015 |
|   | 23.40% Aqueous sodium dodecylbenzenesulfonate | 0.64 |
|   | Water | 6.37 |
| H | Sodium persulfate | 0.0090 |
|   | Water | 2.17 |
| I | Sodium persulfate | 0.0072 |
|   | Water | 3.49 |

A reactor equipped with stirrer and condenser and blanked with nitrogen was charged with Mixture A. Into the stirred reactor heated to 80° C. were added 24% of Mixtures B and 50% of Mixture C. After an exothermic polymerization took place and the reactor reached peak temperature, the heating and stirring were continued at 80° C. for 10 minutes. The remaining Mixtures B and C were gradually added into the reactor in 25 minutes. After the addition was completed, the reactor was kept at 80° C. for 30 minutes. The particle size of the emulsion was 81 nm as measured by a Brookhaven Instruments particle size analyzer BI-90. Mixtures D and E were gradually added into the reactor in 90 minutes. After the addition was completed, the reactor was raised to 85° C. Mixture F was gradually added into the reactor in 30 minutes before the reactor temperature was lowered to 80° C. The stirring and heating at 80° C. were continued for another 30 minutes. The particle size of the resulting emulsion was 110 nm as measured by a Brookhaven Instruments particle size analyzer BI-90. Mixtures G and H were then gradually added into the reactor in 30 minutes. After the addition was completed, the reactor was raised to 85° C. Mixture I was gradually added into the reactor in 30 minutes before the reactor temperature was lowered to 80° C. The stirring and heating at 80° C. were continued for another 30 minutes before cooling the reactor to ambient temperature. The particle size of the resulting emulsion was 111 nm as measured by a Brookhaven Instruments particle size analyzer BI-90.

EXAMPLES 19-21

The emulsions of examples 2, 3, and 18 were freeze dried. The dried polymer was first milled using a Collin Mill (W. H. Collin GmbH Maschienefabrik, Aichach, Germany) at 175° C. for 3 minutes. After the milling was completed, the molten polymer was stripped from the metal rolls and placed in a metal mold to press into thin film sheets with a thickness in the range from 150 μm to 300 μm. A CARVER press (Carver Press Inc., Menomonee Falls, Wis.) was used with an operating temperature of 185° C. and a pressing conditions of 2.268 tons for 3 minutes, followed by 9.07 tons for 2 minutes, and a 5-minute cooling period (room temperature) at 9.07 tons. The tear propagation resistance, tensile strength, elongation and modulus were measured and listed in Table 2.

EXAMPLES 22-24

The emulsions of examples 4, 6, 8 were freeze dried. The dried polymer was placed into a metal mold and pressed into thin film sheets with a thickness in the range from 150 μm to 300 μm. A CARVER press (Carver Press Inc., Menomonee Falls, Wis.) was used with an operating temperature of 185° C. and pressing conditions of 2.268 tons for 3 minutes, followed by 9.07 tons for 2 minutes, and a 5-minute cooling period (room temperature) at 9.07 tons. The films were peeled off from the metal mold, folded and placed into the mold, and pressed under the above conditions for the second time before the mechanical properties were measured. The tear propagation resistance, tensile strength, elongation and modulus were measured and are listed in Table 2.

EXAMPLES 25-28

The emulsions of examples 9, 10, 11, 12 were freeze dried. The dried polymer was processed with a lab bench scale single screw extruder (RANDCASTLE Extrusion Systems, Inc., Cedar Grove, N.J.) with a 3 mm strand die. The temperature setting for the extruder was 120° C. for zone 1, 185° C. for zone 2 and zone 3, the die temperature was also set at 185° C. The RPM was set in the range from 20 to 40. The polymer strand was collected and then placed into a metal mold and pressed into thin film sheets with a thickness in the range from 150 μm to 300 μm. The press conditions were the same as the examples 14-16. The tear propagation resistance, tensile strength, elongation and modulus were measured and are listed in Table 2.

TABLE 2

| Sample ID | Tear propagation resistance (kg/cm) | Tensile strength (psi) | Elongation (%) | Modulus (psi) |
|-----------|-------------------------------------|------------------------|----------------|---------------|
| Example 19 | 18.2 | 1539 | 515 | |
| Example 20 | 16.6 | 1100 | 718 | 8324 |
| Example 22 | 13.2 | 1274 | 173 | 7867 |
| Example 23 | 28 | 817 | 95.7 | 4772 |
| Example 24 | 26.5 | | | |
| Example 25 | 8.36 | 1618 | 100 | 8275 |
| Example 26 | 38.7 | | | |
| Example 27 | 15.5 | 2609 | 324 | 7810 |
| Example 28 | 25.6 | 339 | 286 | 558 |

EXAMPLES 29-33

Emulsion examples 1, 11, 13-17 were freeze dried. The polymer insoluble fractions and swell ratio were determined using the methods described above, and the results were listed in Table 3. Film tear strength was also collected with the film samples prepared using a CARVER press and conditions described previously. The results are listed in Table 3.

TABLE 3

| Sample ID | Insoluble (%) | Swell ratio | Film tear strength (kg/cm) | Light transmission (%) | Haze (%) |
|-----------|---------------|-------------|----------------------------|------------------------|----------|
| Example 19 | 8.7 | 30 | 18.2 | 91-92 | 15-17 |
| Example 27 | 79.6 | 10.1 | 15.5 | 91-92 | 13-15 |

TABLE 3-continued

| Sample ID | Insoluble (%) | Swell ratio | Film tear strength (kg/cm) | Light transmission (%) | Haze (%) |
|---|---|---|---|---|---|
| Example 28 | 8.5 | 29.8 | 25.6 | | |
| Example 29 | 73.3 | 23.5 | 24.4 | | |
| Example 30 | 52.5 | 25.5 | 19.7 | | |
| Example 31 | 83.9 | 15.1 | 11.8 | | |
| Example 32 | 97.3 | 6.5 | 6.92 | | |
| Example 33 | 72.1 | 19.9 | — | 88-89 | 80-82 |
| Example 21 | | | | 93.5 | 6.6-6.8 |

EXAMPLE 34

An acrylic emulsion copolymer made consistent with example 1 of U.S. Pat. No. 4,141,935 was prepared. The emulsion was then spray dried using a lab spray dryer (NIRO Inc., Soeborg, Denmark). The resulting powder was pelletized with a 30 mm twin screw extruder and 4 mm 2-strand die (Werner & Phleiderer, Ramsey, N.J.). The pelletizing conditions were: temperature was 200 C, feed rate was 20 lbs/hour, and RPM was 150. The pellets were co-extruded with a thermal plastic urethane (TPU) with a weight average molecular weight of 143000 and number average molecular weight of 31000, and a refractive index of 1.50 using a coextrusion blown film line with a 30 mm die (Dr. Collin GmbH, Ebersberg, Germany) to produce a three layer film. A multilayer film with a thickness of 90 μm and a structure of acrylate (30 μm)/TPU (30 μm)/acrylate (30 μm) exhibited the flowing properties: light transmission: great than 92%, a tear propagation resistance (ASTM D1938): 8.08 kg/cm, a tensile strength (ASTM D882): 4339 psi and elongation: 128%.

EXAMPLE 35

The acrylic emulsion from example 11 was isolated using a lab spray dryer (NIRO Inc., Soeborg, Denmark). The resulting powder was blended with the powder from example 34 with the weight ratio of 70:30, and was pelletized with a 30 mm twin screw extruder and 4 mm 2-strand die (Werner & Phleiderer, Ramsey, N.J.). The pelletizing conditions were: temperature was 200 C, feed rate was 20 lbs/hour, and RPM was 150. The pellets were co-extruded with a TPU with a weight average molecular weight of 143000 and number average molecular weight of 31000, and a refractive index of 1.50 using a co-extrusion blown film line with a 30 mm die (Dr. Collin GmbH, Ebersberg, Germany) to produce a three layer film with a structure of acrylate/TPU/acrylate and a weight ratio of acrylate:TPU of 40:60. The film with a thickness of 125 micrometer exhibited a light transmission of great than 92%, a tear propagation resistance (ASTM D1938) of 28.5 kg/cm, a tensile strength (ASTM D882) of 5077 psi and elongation of 419%.

We claim:

1. A melt processed film, comprising two polymer components wherein the first component comprises a $C_1$-$C_6$ alkyl acrylate (co)polymer with a Tg between 60 and 120° C., and the second component comprises a $C_1$ to $C_{12}$ (alkyl)acrylate (co)polymer with a Tg less than 10° C., wherein the gram weight ratio of the first polymer component to the second polymer component is less than 0.85, wherein the swell ratio of the film is at least 15, and wherein one of the polymer components is polymerized in the presence of the other, and wherein the film is formed by melt processing of the polymer components.

2. A film of claim 1 further comprising a third component comprising a $C_1$ to $C_{12}$ alkylacrylate (co)polymer with a Tg of between 60 and 120° C., and wherein gram weight ratio of the combined weight of the first and third components to the weight of the second component is less than 0.85, and wherein two of the components are polymerized in the presence of one of the components.

3. A film of claim 1 wherein the first component has weight average molecular weight less than 1 million.

4. A film of claim 3 wherein the second component has weight average molecular weight greater than 3 million.

5. A film of claim 2 wherein the third component has a weight average molecular weight less than 1 million.

6. A film of claim 1, wherein the first component is polymerized using a cobalt catalyst, and wherein the second component is subsequently polymerized in the presence of the first component.

7. A film of claim 1 wherein the polymer components are formed using emulsion polymerization to create latex particles size less than 500 nanometers prior to melt processing.

8. A film of claim 5, wherein the third component has a weight average molecular weight less than 300,000.

9. A film of claim 1 comprising outer layers on either side of a core layer, wherein said outer layers comprise said two polymer components and the core layer comprises a polymer selected from a thermoplastic polyurethane, a polyvinylbutyral or combinations thereof.

10. A melt processed transparent or light diffusing film, comprising two polymer components wherein the first component comprises a $C_1$-$C_6$ alkyl acrylate (co)polymer with a Tg between 60 and 120° C., and the second component comprises a $C_1$ to $C_{12}$ (alkyl)acrylate (co)polymer with a Tg less than 10° C., wherein the gram weight ratio of the first polymer component to the second polymer component is less than 0.85, wherein the swell ratio of the film is at least 15, and wherein one of the polymer components is polymerized in the presence of the other, and wherein the polymer components comprise less than 5 weight percent, based on the total weight of the polymer components, of crosslinking monomer.

* * * * *